United States Patent

[11] 3,611,207

[72] Inventor Carl N. Klahr
678 Cedar Lawn Ave., Lawrence, N.Y. 11559
[21] Appl. No. 606
[22] Filed Jan. 5, 1970
[45] Patented Oct. 5, 1971

[54] WIDE APERTURE ELECTROOPTIC MODULATOR
10 Claims, 4 Drawing Figs.

[52] U.S. Cl. ................................................. 332/7.51, 250/199
[51] Int. Cl. ................................................. H01s 3/05, H01s 3/18
[50] Field of Search ................................... 332/7.51; 331/94.5; 250/199

[56] References Cited
UNITED STATES PATENTS
3,331,036 7/1967 Colbow .................. 332/7.51
3,439,169 4/1969 Lynch ..................... 250/199

OTHER REFERENCES

O. G. Folberth, " Semiconductor Element Acting as a Light Modulator," Pg. 1019, IBM Tech. Disc Bulletin, Vol. 8 #7, 12/65.

*Primary Examiner*—Rodney D. Bennett, Jr.
*Assistant Examiner*—N. Moskowitz
*Attorney*—Browdy and Neimark

ABSTRACT: This invention consists of a P—N junction electrooptic modulator in a semiconductor exhibiting the Pockels effect. The modulator has a relatively wide optical aperture surrounding the junction. This wide aperture is obtained by use of a junction with a relatively shallow concentration gradient of dopant impurities.

WIDE APERTURE ELECTROOPTIC MODULATOR

THis invention relates to electro-optic modulators for incoherent or coherent optical radiation, and more particularly, to the use of P–N junctions in semiconductor crystals for such electrooptic modulators.

Optical radiation from conventional optical sources is termed incoherent as contrasted with radiation from lasers, which can be coherent. Coherent radiation is produced in well defined electromagnetic modes, in which the relation between the electric and magnetic fields and the radiation direction is well defined.

It is well known that lasers produce beams of optical radiation which are substantially coherent, i.e., wherein most of the optical energy in the beam is in one or a few electromagnetic modes, each characterized by constant phase in a plane normal to the direction of propagation. The property of coherence is described in most textbooks on optics, e.g., "Optics" by Born and Wolf.

Incoherent optical radiation consists of the sum of many individually coherent sources whose phases and polarization are random with respect to each other. MOst conventional optical sources produce incoherent radiation. HOwever, such incoherent radiation can be polarized by the use of polarizing materials.

The present invention provides a convenient means of modulating or varying both coherent radiation and incoherent radiation which has been polarized, by means of an applied voltage. Coherent radiation can be modulated in both its amplitude (intensity) and phase. Incoherent radiation however, when polarized, can be modulated in intensity only.

It is also well known that electromagnetic radiation is characterized by its polarization. Polarization refers to the direction of the electric vector with reference to the direction of the electric vector with reference to the direction of propagation. The property of polarization is also described in standard texts. Each electromagnetic propagation mode produced by a laser has a fixed polarization, to the propagation mode produced by a laser has a fixed polarization, i.e., a fixed direction of the electric vector with reference to the propagation direction. Many optical materials e.g., tourmaline, calcite, mica in prism form (for example Nicol prisms), have polarization directional properties in the sense that they permit radiation of specific polarization to propagate through them, while they exclude the propagation of optical radiation of polarizations perpendicular to their allowed polarization. THus if $\theta$ is the angle between the polarization direction of the incident beam and the optical polarization transmission direction of the crystal, only a fraction $\cos^2\theta$ of the incident radiation can be transmitted. Such a crystal is called a polarizer if it is used to produce polarized light from a beam of mixed polarizations. It is called an analyzer crystal when used to filter out the light whose polarization is perpendicular to its preferred direction.

The terms optical and light as here used will refer to electromagnetic radiation in the visible range, in the ultraviolet range, and in the infrared, including variations of wavelength from 0.1 to 1000 microns.

An optical modulator is a device for varying either the intensity, the phase or the polarization of the optical beam transmitted through it. An electro-optic modulator is such a device which operates by application of an electric field. Variations of the phase or of the polarization of the optical radiation can, respectively, be converted into variations of the direction or of the intensity of the optical radiation. If one modulates the relative phases of two or more interfering rays or beams one can control the diffraction pattern resulting from their interference, and thus one controls the direction of the superposition of these rays. If on the other hand, one modulates the polarization of the optical beam, a polarization analyzer crystal can be used for converting the difference in polarization to a difference in optical intensity emerging from the beam. An electro-optic modulator can therefore be used to apply an electric field to modulate relative phases, hence to control diffraction direction; it can also be used to modulate the polarization, hence to control the intensity, of the optical beam emerging from an analyzer.

The Pockels effect is a well-known physical phenomenon which can be used for modulating either the phase or the polarization of an optical beam by application of an electric field. Certain crystalline materials whose crystal structure has no center of symmetry will exhibit the Pockels effect, which permits their optical index of refraction to be varied by application of an electric field. In such crystals the relation between the change in optical index $\Delta n$ and the applied voltage is s follows:

$$\Delta n = n^3 r = \frac{v}{t} \qquad (1)$$

where $n =$ optical index
$v =$ applied voltage
$r =$ Pockels coefficient or electro-optic coefficient
$t =$ thickness across which the voltage is applied The Pockels coefficient will usually depend on the orientation of the applied voltage $v$ with respect to the crystalline axis. Note that the change in optical index is proportional to the first power of the electric field. However, there may also be a $(v/t)^2$ component, although this is usually small.

If optical radiation traverses a material that exhibits the Pockels effect it will experience a phase retardation $\Gamma$ due to the change in optical index, given by the following expression:

$$\Gamma = 2\pi \frac{L}{\lambda} \Delta n \qquad (2)$$

where $L$ is the length of optical path in the crystal and $\lambda$ is the wavelength. This variation of the phase of the electromagnetic wave traversing a Pockels effect material is the basis of the optical modulation with which this invention is concerned.

Among the materials exhibiting the Pockels effect are the following: ammonium dihydrogen phosphate, potassium dihydrogen phosphate, lithium niobate, barium sodium niobate, and many similar materials.

A description of the Pockels effect as it applies to modulation of a laser beam is given by M. Ross in his book "Laser Receivers" (JOhn Wiley, 1966, pages 208–233). A number of materials which have been used for Pockels effect modulators are mentioned. These include both birefringent crystals and crystals with an optical axis. It is pointed out that the application of the electric field is dependent on the crystal symmetry, i.e., a longitudinal electric field (parallel to the optical path) is used for birefringent crystals such as KDP, ADP, and quartz, while a field transverse to the optical path is used in cubic crystals. These facts are also explained in the other references quoted, and the technology is well known.

The Pockels effect can be used for either polarization modulation or for phase modulation. Phase modulation is applicable primarily to coherent radiation. For phase modulation alone to take place it is necessary to limit the optical radiation propagating through the Pockels effect modulator to a single electromagnetic mode. Application of an electric potential to the modulator produces a variation $\Delta n$ in the optical index of the material according to equation (1) above, which is equivalent to a change in the propagation velocity. This change in velocity of propagation of the electromagnetic wave in the modulator, taken together with the length of the optical path $L$, leads to a change of phase $\Gamma$ as given by equation (2) above. Hence the application of an electric potential to a Pockels effect material leads to phase modulation.

As an example, consider a cubic crystal of the zincblend structure, e.g., gallium arsenide or gallium phosphide crystals. If a single electromagnetic mode is propagated through the crystal and the electric field is applied perpendicular to the propagation direction, one obtains phase modulation of the propagating radiation.

Polarization modulation takes place for coherent optical radiation whenever two different electromagnetic modes re propagated through the modulator. The change in optical index $\Delta n$ given by equation (1) is then usually different for each mode, because the value of the Pockels coefficient $r$ will depend on the particular electromagnetic mode, and on the crystalline direction for any selected optical path. Hence the phase retardation $\Gamma$ will be different for each mode, and one mode will be advanced or retarded in phase relative to the other. Such a change in relative phase of the modes is equivalent to a change in the plane of the resultant electric vector. There is a change in polarization of the optical radiation leaving the modulator, as compared with the input radiation polarization. If a polarization analyzer crystal is placed at the output face of the crystal the output intensity I will be (in the absence of optical absorption) for two modes of equal amplitude whose polarizations are at right angles, $I=I_o 2\ [1-\sin(\Gamma_2-\Gamma_1)]$ where $I_o$ is the input intensity, $\Gamma_1$ is the change in phase of the second mode, when both modes have equal amplitude. Thus polarization modulation through an angle $\Gamma_2-\Gamma_1$ takes place in a Pockels effect modulator, which can be converted to intensity modulation by use of an analyzer crystal.

Polarization modulation can also be obtained with incoherent radiation incident on the Pockels effect modulator. Incoherent radiation is equivalent to a large number of individual modes propagating without interaction with one another. If a polarizer crystal is placed at the input face of the modulator, only that component of each mode enters whose polarization is parallel to the polarizer crystal. An analyzer crystal with polarization direction at a large angle to the polarizer crystal is placed at the exit face of the modulator. This will prevent much of the radiation from passing. Application of a voltage to the Pockels effect modulator will then rotate the plane of polarization of each mode, thus varying the fraction of its energy which will be transmitted by the analyzer crystal.

Many semiconductors also exhibit the Pockels effect. These include most binary 2-6 semiconductors (in which one element comes from the second column and the other from the sixth column off the periodic table) and most 3-5 semiconductors (in which one element comes from the third column and the other from the fifth column of the periodic table). In addition there are 1-7 semiconductors such as copper chloride. It is with all such semiconductors which exhibit the Pockels effect that this invention is concerned.

Some examples of 2-6 semiconductors showing the Pockels effect are cadmium sulfide, zinc sulfide, zinc telluride, zinc selenide, and similar 2-6 compound semiconductors. Some examples of 3-5 semiconductors showing the Pockels effect are gallium arsenide, gallium phosphide, gallium arsenide phosphide, aluminum phosphide, gallium aluminum arsenide, and similar 3-5 compounds. It will be apparent from the description below that the principles of this invention will apply to any semiconductor exhibiting the Pockels effect in which PN junctions are formed.

A semiconductor is a material whose electronic properties are primarily governed by the concentration of dopant impurities inserted therein. Dopant concentrations conventionally range from $10^{13}$ cm.$^{13}$ to $10^{21}$ cm.$^{13}$ depending on the semiconductor. In gallium arsenide for example, concentrations of $10^{15}$ cm.$^1$ to $10^{19}$ cm.$^{13}$ are usually inserted.

Two types of electronic conduction are present in semiconductors: N-type conduction by electrons and P-type conduction by positive holes. Dopant impurities are classified as N and P type depending on whether they insert N-type carriers or P-type carriers. A number of methods can be used for insertion of these dopant impurities. These include diffusion, epitaxial growth, neutron transmutation doping, ion implantation, and doping in the melt. Insertion of dopants in the melt from which a crystal is grown is a common method for inserting a desired dopant concentration uniformly in a crystal as the crystal is grown from its molten state. These doping methods have been described in the technical literature.

A PN junction occurs on the interface plane (or other surface) dividing the N-type crystal volume in which the net effect of the doping is to make it N type, wherein the electrical carriers are electrons, from the P-type crystal volume in which the net effect of doping is to make the crystal volume P-type wherein the electrical carriers are positively charged holes. The PN junction properties are of particular utility as Pockels effect modulators and will be described below. However, two known doping methods to produce PN junctions will first be briefly described.

According to the diffusion method, impurities re diffused into the semiconductor crystal from an external source at an elevated temperature in a vacuum chamber or a chamber of specified atmosphere. The dopant may be introduced into the diffusion chamber in gaseous form or as chemical reactants whose reaction product yields the dopant. Alternatively the dopant may be deposited onto the semiconductor crystal before the diffusion takes place. By heating the semiconductor crystal in the dopant environment at appropriate temperatures and for sufficiently long times, the dopant impurities will diffuse into the interior of the crystal. If sufficiently high temperatures and sufficiently long diffusion times are used, one can obtain an arbitrary dopant concentration in the interior.

An important characteristic of the impurity distribution is its concentration gradient in the bulk of the material at various depths below the surface. This concentration gradient is measured in dopant impurities per cm.$^3$ per unit distance normal to the surface. In gallium arsenide for example, dopant concentrations from $10^{14}$ cm.$^{13}$ to $10^{20}$ cm.$^{13}$ are conventionally obtained from P-type dopants, while $10^{19}$ cm.$^{13}$ is the upper limit for N-type dopants. Concentration gradients are usually in the neighborhood of $10^{23}$ cm.$^14$ to $10^{25}$ cm.$^14$ in junctions usually produced. It will be understood however, that longer diffusion times can give much lower concentration gradients.

In fabricating a PN junction by diffusion the crystal is first doped uniformly in the process of its growth, as one conductivity type, e.g., N type. Diffusion of the other impurity conductivity type, e.g., P type, then is performed from outside the crystal as described above. A PN junction forms along the surface where the indiffusing P-type concentration equals the bulk N-type concentration in the crystal.

It should be pointed out that many time-temperature diffusion procedures can be used. One of these is limited source diffusion. In this procedure the first step consists of diffusion into the crystal from an external source. The semiconductor crystal is then removed from contact with the external source and the diffusion process is continued. This limited source procedure tends to give deeper PN junctions with much smaller concentration gradients than conventional single-step diffusion in contact with the external source, especially when the second (limited source) diffusion is carried out at higher temperatures than the first diffusion.

Another method for doping a semiconductor crystal to make a PN junction is neutron transmutation doping in a nuclear reactor. This method has been described by Klahr in U.S. Pat. No. 3,255,050 issued June 7, 1966. The method will be briefly described here as it applies to gallium arsenide. One starts with a uniformly doped P-type crystal of gallium arsenide. A radiation die of cadmium or some other thermal neutron absorber is placed around the wafer. A series of slits or openings are formed in the radiation die to permit thermal neutrons to enter the gallium arsenide in locations which are to be doped N type. The thermal neutrons entering the gallium arsenide lead to neutron transmutation nuclear reactions in which N-type dopants are formed. These N-type dopants are germanium and selenium in the case of gallium arsenide. One can show from the nuclear cross sections that for each $7\times10^{17}$ neutrons per cm.$^2$ incident on the gallium arsenide one produces approximately $10^{17}$ cm.$^{13}$ N-type dopants. Thus if the unshielded region has an initial concentration of $5\times10^{17}$ cm.$^{13}$ P type, one requires $70\times10^{17}$ neutrons per cm.$^2$ to produce a final concentration of $5\times10^{17}$ cm.$^13$ N type. The gallium arsenide region which is shielded by the cadmium experiences a much lower neutron transmutation rate and therefore remains P type. After an annealing step is performed the PN junction properties can be observed.

This procedure can be practiced in a number of Pockels effect semiconductors including gallium arsenide, gallium phosphide, gallium arsenide phosphide, indium antimonide, and other semiconductors.

PN junctions produced in Pockels effect semiconductors by both these procedures, as well as by the others mentioned, behave as optical modulators. This will be described below.

It is well known that in a semiconductor exhibiting the Pockels effect a PN junction can be used as an electro-optic modulator. The optical path of the radiation must be directed along the PN junction. It is apparent that in such a modulator the semiconductor region immediately surrounding the junction must be transparent to the radiation. It is also apparent that electrical contacts must be made to the semiconductor on both sides of the PN junction in order to apply an electric field across the junction. Reinhart, Nelson, and others have described the use of a PN junction in gallium phosphide as an optical modulator. This work will be referenced below. I have demonstrated the use of a PN junction in gallium arsenide as an optical modulator. These materials are typical of the entire class of semiconductors exhibiting the Pockels effect, in all of which PN junction modulators can be prepared.

A PN junction electro-optic modulator has two significant advantages over other Pockels effect modulators: It can operate with much lower voltages and it is much smaller in size than bulk modulators utilizing the effect. PN However, PN junction modulators have a significant disadvantage: a much narrower optical aperture than one can conveniently work with.

The present invention discloses a PN junction design that overcomes the disadvantage of narrow optical aperture. I have made PN junction electro-optic modulators with optical apertures up to 100 times greater than those reported in previous work and with voltage modulation capability in the same low-voltage range as other junction modulators. This optical modulator design will give a practical and convenient electro-optic modulator with low-voltage capability, small size, and sufficiently wide optical aperture to pass substantial optical power and to permit easy alignment with an incident optical beam.

It is the objective of this invention to provide a PN junction electro-optic modulator with much wider aperture than those previously disclosed, while preserving the low voltage capability of presently known PN junction modulators.

Other objectives, advantages, and novel features of the invention will become apparent from the following detailed description of the invention when considered in conjunction with the accompanying drawings, wherein:

Figure 1:
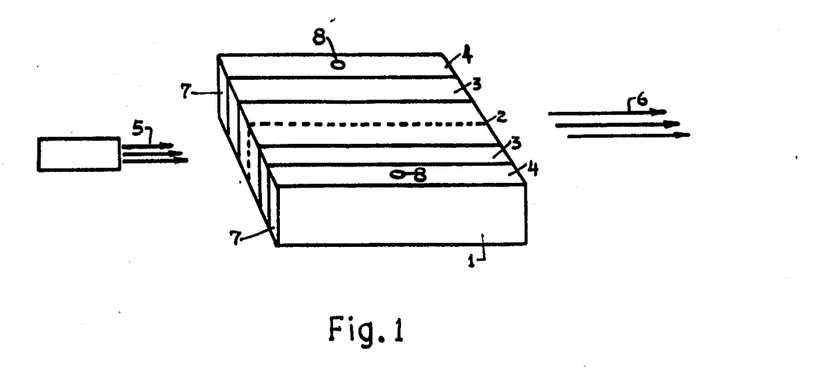
FIG. 1 is a schematic view of a PN junction which can be used as an electro-optic modulator.

This invention will be described in greater detail by reference to the accompanying drawings. Referring to FIG. 1, there is shown a semiconductor crystal denoted 1 exhibiting the Pockels effect, wherein a PN junction whose plane is denoted 2 has been formed. On one side of the junction the net doping of the crystal is P type, on the other side of the junction the net doping of the crystal is N type. The PN junction plane 2, normal to the crystal surface, is a plane where P-type dopant concentration equals N-type dopant concentration, leading to a zero net dopant concentration at the junction. Surrounding the junction is a space charge region whose boundary planes are denoted 3, across which there appears any electric potential applied to the PN junction electrical terminals, which are denoted 8. Very little of the applied potential appears throughout the rest of the diode, because of its appreciable conductivity, while most of its appears across the space charge region immediately surrounding the junction plane 2.

Enclosing or coterminal with the space charge region is a dielectric waveguide region whose boundary planes are denoted 4. A beam of optical radiation denoted 5, whose direction of propagation is parallel to the junction plane 2, will be confined within the dielectric waveguide region boundaries 4. The dielectric waveguide region confines the optical radiation because its optical index of refraction is slightly different from that of the surrounding semiconductor in which the concentration of electrical carriers is much greater than in the region surrounding the junction. This effect will be discussed below.

The beam of optical radiation leaving the PN junction modulator is denoted 6. If a voltage is applied across the contact terminals 8, an electric field is present across the space charge region between boundaries denoted 3, leading to a change in the optical index because of the Pockels effect. This will modulate the phase of each electromagnetic wave mode propagating within the dielectric waveguide boundaries 4, leading to a phase modulation of the optical beam 6 leaving the junction modulator. As previously explained, if two or more coherent electromagnetic modes are propagating, polarization modulation takes place. If an incoherent beam is propagating between crossed polarizers, polarization modulation also takes place.

Optical input and output terminals can be used to align the optical beam with the dielectric waveguide region. Such optical systems are well known, including lens systems, mirror systems, fiber optics, and other means for coupling an optical beam to follow a desired optical path within a limited region.

The optical entrance faces of the modulator not within the dielectric waveguide region is denoted 7. These faces can be covered with an opaque mask to prevent the entrance of optical radiation which will not be modulated. The electrical contacts to each side of the junction are denoted 8.

Figure 2:
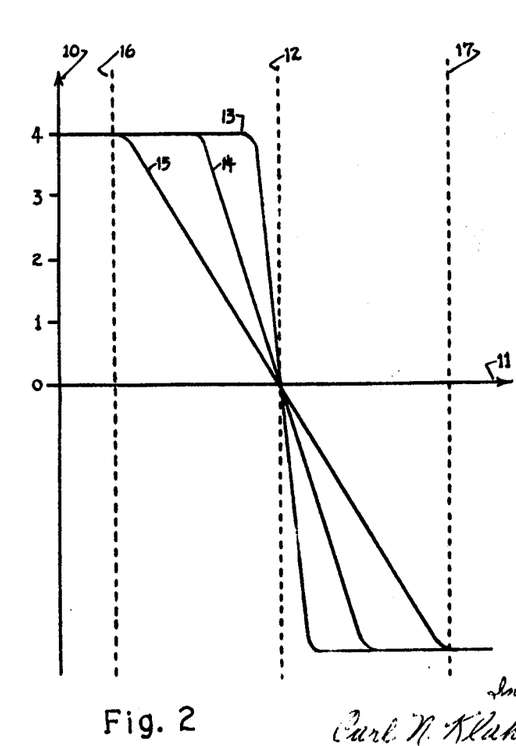
FIG. 2 represents a cartesian graph of the various dopant impurity distributions which may be fabricated in such a PN junction modulator.

The specific design features of the PN junction modulator which comprises the present invention will be described by reference to FIG. 2, wherein a cartesian graph of net dopant impurity concentration versus distance normal to the plane of the PN junction is shown. On this graph the ordinate denoted 10 represents the net dopant concentration, taken as positive for one type dopant (e.g. for N type) and as negative for the other dopant type, i.e., P type. The abscissa of the graph, denoted 11, represents distance through the semiconductor crystal normal to the plane of the PN junction. The ordinate value at the intersection with the abscissa is zero, corresponding to zero net concentration. The scale of the ordinate may be concentration in units of $10^{17}$cm.$^{13}$ for example, depending upon the dopant level. In a more lightly doped crystal the concentrations may be measured in units of $10^{16}$cm.$^{13}$ or in units of $10^{18}$cm.$^{13}$ in a more heavily doped crystal; thus the concentration scale will depend on the crystal doping. The scale of distances along the abscissa may be in microns or in mils (1 mil =25 microns). The abscissa of the dotted line 12 represents the location of the PN junction plane. Of particular importance in this invention is the variation of concentration with distance in the neighborhood of the junction.

The graph denoted 13 represents a concentration-versus-distance curve that varies rapidly in the neighborhood of the PN junction. The concentration gradient is the slope of this curve. It is apparent that for graph 13 the concentration gradient is very high in the neighborhood of the junction. Typical concentration gradients in conventional junctions have values of the order of $10^{23}$cm.$^{14}$ to $10^{25}$ cm.$^{114}$. The graph denoted 14 represents a concentration-versus-distance curve that varies rapidly in the neighborhood of the PN junction than for graph 13. However, the concentration gradient is still high at the P—N junction. The graph denoted 15 represents a concentration-versus-distance curve that is slowly varying in the neighborhood of the PN junction as compared with graph 14 or graph 13. The concentration gradient at the PN junction is much smaller for graph 15 than it is for graphs 14 and 13. It is a curve similar to graph 15 which is required in the present invention.

The boundaries of the dielectric waveguide region for concentration graph 15 are shown by the abscissas of the vertical lines 16 and 17.

The optical modulator design that comprises the present invention may be described as follows: I have found that when the dopant concentration graph corresponds to concentration gradients less than $10^{22}$cm.$^{14}$ in the neighborhood of the PN junction at conventional levels of doping in Pockels effect semiconductors, the width of the dielectric waveguide region, i.e. the abscissa difference distance between lines 16 and 17, can be increased by decreasing the concentration gradient in the PN junction neighborhood. For concentration gradients less than $10^{22}$ cm.$^{14}$ I have found that the dielectric waveguide region is 10 microns wide or wider. This is at least five times wider than the dielectric waveguide width that is obtained in PN junction modulators of usual design. Since a 10 micron width is the minimum conveniently usable, as will be shown below, a junction design in which the concentration gradient is less than $10^{22}$ cm.$^{14}$ will give a useful dielectric waveguide width.

I have further found the following relation for the concentration gradient which is required in the junction neighborhood in order to produce a dielectric waveguide region of width greater than $w$:

$$\frac{\partial N}{\partial x} \leq \frac{\Delta N}{w} \quad (3)$$

where $\partial N / \partial x$ = concentration gradient in the neighborhood of the PN junction $\Delta N$ = algebraic difference in concentrations in the bulk regions on the two sides of the junction $w$ = width of the dielectric waveguide region $\Delta N$ can be expressed as follows: $\Delta N = N_n - (-N_p) = N_n + N_p$ where $N_n$ is the N-type dopant concentration one side of the junction and $N_p$ is the P-type concentration on the other side of the junction.

Thus, for example, if $N_n = 5 \times 10^{17}$ cm.$^{13}$ and $N_p = 3 \times 10^{17}$ cm.$^{13}$ and if one wants a dielectric waveguide region width of at least = 50 microns = $50 \times 10^{14}$ cm., then the upper limit on the concentration gradient is calculated as follows:

$$\frac{\partial N}{\partial x} < \frac{5 \times 10^{17} \text{ cm.}^{-3} - (-3 \times 10^{17} \text{ cm.}^{-3})}{50 \times 10^{-4} \text{ cm.}} = 1.6 \times 10^{20} \text{ cm.}^{-4}$$

Thus relation (3) provides an upper limit on the concentration gradient required in order to obtain a wide dielectric waveguide region of width $w$ within which the optical radiation can be contained.

This invention thus comprises a PN junction modulator design in which the dielectric waveguide width is at least 10 microns and in which either (a) the maximum concentration gradient is less than or equal to $10^{22}$ cm.$^{14}$ or (b) for dielectric waveguides of width $w$ to be obtained, the concentration gradient shall be less than the ratio given by inequality (3). Electrical contacts are attached to both sides of the PN junction to apply a potential across the junction.

Figure 3:
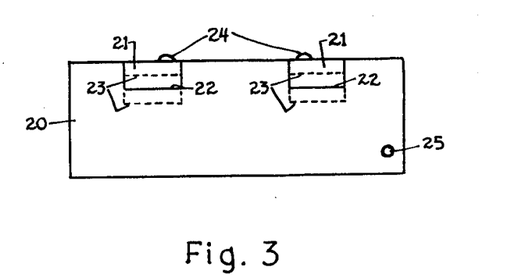
FIG. 3 is a schematic diagram of the doping configuration in a semiconductor crystal with multiple PN junctions with wide apertures parallel to the surface.

A typical doping configuration of a semiconductor crystal in which multiple PN junctions with wide dielectric waveguide regions are formed is shown in FIG. 3, in which two such junctions are shown. The semiconductor crystal, denoted 21 have the active P—N junction, denoted 22, approximately parallel to the surface. The concentration gradient in the neighborhood of the junction is relatively small, leading to wide dielectric waveguide regions with boundaries denoted 23, parallel to the surface. Electrical contacts in the P-type regions are denoted 24 and an electrical contact to the bulk crystal is denoted 25.

Figure 4:
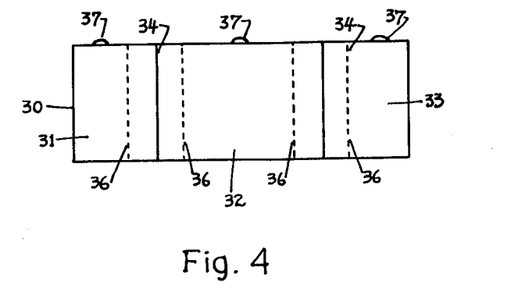
FIG. 4 is a schematic diagram of the doping configuration in a semiconductor crystal with multiple PN junctions with wide apertures perpendicular to the surface.

A typical doping configuration in which multiple junctions with wide dielectric waveguide regions are produced normal to the semiconductor crystal is shown in FIG. 4. The semiconductor crystal is denoted 30. Alternately doped regions denoted 31, 32, and 33 are respectively either N, P, and N doped, or P, N, and P doped. The PN junctions bnoted 34 have a relatively small concentration gradient in their neighborhood, leading to wide dielectric waveguide regions with boundaries denoted 36. Electrical contacts denoted 37 are attached to each region to apply a voltage across the junction.

Before giving a more detailed description of the advantages and methods of the present invention, it is advantageous to understand in detail the principles of the PN junction modulator.

The PN junction modulator utilizes phase retardation or advancement of optical radiation guided through the depletion layer region of reverse biased PN junctions. Consider for example, a PN junction in gallium arsenide The phase retardation is caused by the linear electro-optic or Pockels effect arising from the electric field across the reverse-biased junction. The large size of this field leads to sizable phase differences between polarized light beams propagating along the plane of the junction when different values of bias voltage are applied.

The electro-optic effect changes optically isotropic gallium arsenide into a uniaxial or biaxial crystal, depending on the orientation of the electric field. If the electric field is oriented in the (111) direction, a uniaxial crystal results with its optic axis aligned with the field. The field is then characterized by two refractive indices, $n_\perp$ and $n_\parallel$ where $n_\perp$ is the ordinary index of refraction and $n_\parallel$ is the extraordinary index.

One can understand the phase retardation effect most simply when the junction field is in the (111) direction to give a uniaxial optic effect. Thus one would cleave the crystal along the (110) direction.

Two propagation modes can be utilized: (1) the TE mode with the E vector parallel to the junction field. This is the propagation mode of the ordinary ray. (2) The TM mode with the E vector perpendicular to the junction field. This is the propagation mode of the extraordinary ray. These modes are each characterized by their own refraction index:

TE mode: $n_\parallel = n\left(1 - Er_{41}\frac{n^2}{\sqrt{3}}\right)$

TM mode: $n_\perp = n\left(1 + Er_{41}\frac{n^2}{2\sqrt{3}}\right)$ $n$ is the normal index of refraction, $E$ is the magnitude of the field, $r_{41}$ is the electro-optic coefficient for the material and $n_\perp$ and $n_\parallel$ are respectively, the indices for the ordinary and extraordinary rays in the presence of the field.

The following values apply to gallium arsenide for 1 to 10 micron optical radiation:

$n \approx 3.36$ $r_{41} \approx 1.6 \times 10^{1}{}_{10}$ cm./volt

One can estimate as follows the minimum PN junction length in gallium arsenide to obtain a phase difference of $\pi$radians The phase difference $\Delta\Phi$ between two values of voltage leading to indices of refraction $n_1$ and $n_2$ is given by $$\Delta\phi = \frac{2\pi l}{\lambda}(n_1 - n_2)$$

In this equation $\lambda$ is the free-space wavelength and $l$ is the length of the junction.

By choosing the appropriate polarization orientation with respect to the junction, one can use either $n_\perp$ or $n_\parallel$ Consider the case for $n_\parallel$. The difference in index of refraction between the voltage on and voltage off conditions is $$n_1 - n_2 = Er_{41}\frac{n^3}{\sqrt{3}}$$

This leads to a phase difference $$\Delta\phi = 2\pi\frac{l}{\lambda}Er_{41}\frac{n^3}{\sqrt{3}}$$

The electric field $E$ is expressed as $E=V/t$ where $V$ is the applied voltage across the junction and $t$ is the width of the space charge region in the junction. Typical values which one can use for conventional narrow junctions are $V=10$ volts, $t=1.8\times10^{14}$ cm. $= 1.8$ microns leading to $E=55,000$ volts per cm. The $t$ value is determined from capacitance measurements on conventional junctions. The junctions used in the present invention will have larger $t$'s, of the order of 10 microns and voltages of about 50 to 100 volts will be used.

The length of junction required is given by the expression $$l = \frac{\Delta\phi}{2\pi}\lambda\frac{\sqrt{3}}{Er_{41}n^3}$$

Let us consider $\lambda=1.15$ microns corresponding to a Helium-neon laser. Inserting the values cited above for $V=50$ volts, $t=10$ microns, gives $l=0.38 = 150$ mils.

It is well known that the region around a PN junction acts as a "dielectric waveguide" to contain the propagating optical radiation. This phenomenon has been observed for many diodes with relatively abrupt junctions. We have found that if the junction is a relatively gradual one the dielectric waveguide phenomenon is even more significant. Theoretical considerations of the propagation of electromagnetic energy near a PN junction show that the "sandwich" formed by having a depletion layer bounded by the P and N type regions can act as a dielectric waveguide. (See for example the theoretical article by Yariv and Leite, and the experimental article by Bond, Cohen, Leite and Yariz in the Feb. 1963 Applied Physics Letters.)

The confinement of the energy is due to a dielectric discontinuity between the depletion layer and the bulk semiconductor. The change $\delta\epsilon$ in the dielectric constant $\epsilon_o$ is given by $$\delta\epsilon = \epsilon_0 \frac{\omega_p^2}{\omega^2}$$

where $\omega_p =$ plasma frequency due to free charge carriers
$\omega\ \ =$ frequency of the radiation
$= 2\pi c/\lambda$ where $c$ is the speed of light in the medium and
$\lambda$ is the wavelength in the medium The dielectric discontinuity is due to the finite conductivity of the medium, i.e. to the electronic susceptibility. This is the direct analogue of the dielectric discontinuity at a boundary with a metal. However, the effect is much greater in a semiconductor because:

a. the conductivity is much less than in a metal
b. the discontinuity is less abrupt The dielectric waveguide width is the analogue of the skin depth in a metal.

The advantages of a PN junction electro-optic modulator in a Pockels effect semiconductor are principally its small size and its low voltage requirements. One can obtain a high-percentage modulation of the optical power passing through it with voltages in the order of a few tens of volts, when the dimensions of the junction length in the crystal are a fraction of an inch, e.g., of the order of 100 mils. Characteristics of a PN junction modulator in gallium phosphide are described by F.K. Reinhart in the Journal of Applied Physics, Vol. 39, No. 7, June 1968, Pgs. 3426-3434 and by Reinhart, Nelson and McKenna in the Physical Review, Vol. 177, No. 3, 15 Jan., 1969. One obtains modulation capability with relatively low voltage. In comparison, bulk Pockels effect modulators require hundreds of volts to several thousand volts unless they are very long, e.g., a 10-inch long Pockels effect bulk modulator can also operate with less than 100 volts. A bulk effect modulator uses a crystal slice of small thickness, of the order of millimeters or tens of mils (1 mm. = 40 mils).

The reason that a PN junction modulator requires less voltage is that the voltage is applied over a very thin region, the space charge region of the junction. It is the electric field, voltage per unit width, that determines the phase change in the Pockels effect. In PN junctions this space charge region width across which the voltage is applied is quite narrow, e.g., of the order of a micron or less. Hence a small voltage, e.g., 10 volts over 1 micron which is $10^{14}$ cm., gives an electric field of 100,000 volts per cm. It requires a voltage of 2500 volts to obtain this same electric field over a thickness of 10 mils = 0.025 cm. Hence the PN junction is much more effective than the bulk modulator in this regard.

In two senses however, the PN junction is much less advantageous than a conventional bulk Pockels effect modulator. The optical aperture through which the light passes is much narrower than in a conventional device. This optical aperture is identical with the dielectric waveguide region of the junctions. It is typically of the order of one or two microns. A narrow optical aperture admits only a small amount of optical radiation. Hence the amount of optical radiation (optical power) which can be modulated with a conventional PN junction modulator is quite limited. This is a significant disadvantage of the conventional PN junction modulator.

A second disadvantage of previously known PN junction modulators, in addition to the small amount of light passing through it, is the difficulty in alignment of an optical beam to pass through the modulator. A dielectric waveguide of narrow width cannot confine light entering at a large angle to its axis. This the narrow optical aperture, i.e. the narrow width of the dielectric waveguide region, makes it difficult to align this optical beam to make a very small entrance angle with its axis. If, for example, the length of the optical path through the junction is 50 to 100 mils, corresponding to 1250-2500 microns, and if the optical aperture is 2 microns, the beam must be aligned to within an angle $$\theta = \frac{2\text{ microns}}{1250\text{ microns}} \approx 2\times 10^{-3}\text{ radian}$$

of the PN junction centerline. This presents two problems: First there are difficulties in making the junction follow a straight line to within this small angular deviation. Second, there is the difficulty of aligning the optical beam to pass within the junction.

Thus the conventional PN junction modulator with narrow dielectric waveguide has significant disadvantages that prevent its practical utilization.

I have found a design for a PN junction modulator which overcomes the two aforementioned disadvantages while preserving advantages of low voltage modulation and small size. This design may be described as follows:

The junction is fabricated to give a much wider dielectric waveguide region. It was found that a minimum dielectric waveguide width of 10 microns is required to be practical with regard to overcoming the small angular deviations which occur in fabricating the junction and for alignment of the optical beam within the junction. For a 50 mil junction length, 10 microns is about $$\frac{2/5\text{ mil}}{50\text{ mils}} = 0.8\times 10^{-2}\text{ radian} = \tfrac{1}{2}\text{ degree}$$

One finds it practical to utilize dielectric waveguide width of 10 microns or greater.

The present invention comprises a design for PN junction modulators which gives dielectric waveguide widths ranging from 10 microns to 100 microns (4mils) as the design parameters are varied. The width of the dielectric waveguide regions of these junctions has been demonstrated by passing polarized light through the junction through a polarizer and analyzer according to conventional methods (see reference to M. Ross above) and photographing the light output when the film is directly adjacent to the screen. One finds that the size of image can be made as wide as 4 mils.

The junction design which gives this wide dielectric waveguide is characterized by a much lower than usual concentration gradient in the neighborhood of the PN junction. It was found that this is the characteristic that gives a wide dielectric waveguide region, namely a small concentration gradient.

The concentration gradient is measured in units of dopant concentration change per unit length normal to the junction. Since the dopant concentration is measured in units of number of dopant impurities per cm.$^3$ and since length normal to the junction is measured in centimeters, the concentration gradient is measured in units of number of dopant impurities per cm.$^4$.

An upper limit to the concentration gradient which could give a specified dielectric waveguide width $w$ was found to be the following: The algebraic difference in concentrations on the two sides of the junction, divided by the specified width $w$ of the dielectric waveguide region. In taking the algebraic difference in concentrations, the N and P type concentrations are taken with opposite sign.

The maximum concentration gradient for which the smallest conveniently usable dielectric waveguide width of 10 microns is obtained can be shown to follow this rule as follows: The minimum width of 10 microns is obtained with a concentration difference of $10 \times 10^{18}$ cm.$^{13}$ $^3$ on the two sides of the junction. The 10 micron width is $10 \times 10^{14}$ cm. = $10^{13}$ cm. Thus the upper limit of the concentration dielectric waveguide width is $$\frac{10 \times 10^{18} \text{ cm.}^{-3}}{10^{-3} \text{ cm.}} = 10^{22} \text{ cm.}^{-4}$$

Hence the maximum concentration gradient for which a dielectric waveguide of conveniently usable width was obtained was $10^{22}$ cm.$^{14}$. This is a considerably smaller concentration gradient than previous designs for PN N junction modulators. For example, Reinhart (cited above) describes modulators with junction area dimensions of 50 microns (parallel to the junction) and length of 1.5 mm., having a zero bias capacitance of 40 picofarads. One can calculate that the space charge region of the junction has a width of about 0.4 microns and that the concentration gradient corresponding to these values is several times $10^{23}$ cm.$^{14}$ The advantages of PN junction modulators with much lower concentration gradients have not previously been realized.

Dielectric waveguide widths much larger than 10 microns have been obtained by the use of much smaller concentration gradients. The important design feature in my wide dielectric waveguide modulators is the use of a small concentration gradient in the junction neighborhood which satisfies the inequality that the concentration gradient shall be less than or equal to the ratio $$\frac{\text{Algebraic difference of concentrations on the two sides of the junction}}{\text{Specified dielectric waveguide width}}$$

Several typical wide dielectric waveguide PN junction modulators have the following parameter values, as specified in Table 1.

TABLE 1.—P-N JUNCTION MODULATOR PARAMETERS

| Concentration | | Algebraic difference (cm.$^{-3}$) | Dielectric waveguide width (microns) | Upper limit concentration gradient (cm.$^{-4}$) |
|---|---|---|---|---|
| N type (cm.$^{-3}$) | P type (cm.$^{-3}$) | | | |
| $6 \times 10^{17}$ | $4 \times 10^{17}$ | $10 \times 10^{17}$ | 25 | $4 \times 10^{20}$ |
| $5 \times 10^{17}$ | $3 \times 10^{17}$ | $8 \times 10^{17}$ | 50 | $1.6 \times 10^{20}$ |
| $4 \times 10^{17}$ | $2 \times 10^{17}$ | $6 \times 10^{17}$ | 75 | $0.8 \times 10^{20}$ |
| $2 \times 10^{17}$ | $1.5 \times 10^{17}$ | $3.5 \times 10^{17}$ | 100 | $0.35 \times 10^{20}$ |

Such PN junction modulators have been made as follows: Using the neutron transmutation technique, a crystal of gallium arsenide for example, is completely enclosed in a cadmium radiation die 10 mils thick except for slits 60 mils thick on each side opposite one another. The gallium arsenide has an initial uniform P-type concentration. For example, consider an initial P-type concentration of $5 \times 10^{17}$ cm.$^{13}$. The semiconductor crystal in its radiation die is exposed in a thermal nuclear reactor to a thermal neutron flux-time product of $14 \times 10^{18}$ neutrons/cm.$^2$. This corresponds to an irradiation of 10 days at a thermal neutron flux of about $1.5 \times 10^{13}$ neutrons/cm.$^2$ sec. The transmutation-induced concentration of N-type dopant impurities in the exposed region of the gallium arsenide under the slit is then about $10 \times 10^{17}$ cm.$^{13}$. The transmutation-induced concentration of N-type dopant impurities under the cadmium shielded region is much less, about $2.5 \times 10^{17}$ cm.$^{13}$. Thus the net impurity dopant levels after the irradiation, and the subsequent annealing process to remove radiation damage effects, are as follows:

Under the slit, unshielded region:
N-type concentration of $5 \times 10^{17}$ cm.$^{13}$
Under the cadmium shield of the radiation die:
P-type concentration of $2.5 \times 10^{17}$ cm.$^{13}$ The concentration gradient obtained in the neighborhood of the PN junction is found to be about $10^{20}$ cm.$^{14}$. This leads to a dielectric waveguide region of width at least $$\frac{5 \times 10^{17} \text{ cm.}^{-3} + 2.5 \times 10^{17} \text{ cm.}^{-3}}{10^{20} \text{ cm.}^{-4}} = 75 \times 10^{-4}$$

or 75 microns. The PN junctions in this case when two opposite slits are used, are normal to the large area crystal surface.

When the diffusion process is used for doping the gallium arsenide, the procedure is typically as follows: A wafer of gallium arsenide is used which is uniformly doped N type with concentration of $5 \times 10^{17}$ cm.$^{13}$. This wafer, after being polished, is placed in a quartz ampul with an excess of arsenic and with a volatile zinc compound as a P-type dopant. About 2 milligrams of arsenic and about 0.1 milligram of zinc arsenide per cm.$^3$ of ampul volume are used. The diffusion into the crystal surface proceeds at about 720° C. for about 50 to 100 hours. The P-tye region then extends between 25 and 50 microns into the crystal. The crystal is then removed from the diffusion furnace and from its ampul. At this point the concentration gradient in the junction neighborhood is of the order of $10^{23}$ cm.$^{14}$ to $10^{24}$ cm.$^{14}$. The crystal is then chemically cleaned to remove surface dopants. It is placed in a new clean quartz ampul with excess arsenic in a chemically inert nonoxygen atmosphere. The ampul is returned to the diffusion oven at 1050° C. to 1100° C. and diffusion proceeds for several hours. Limited source diffusion now takes place. This diffusion proceeds from the previously inserted dopants; no external dopant source is used. This diffusion procedure decreases the concentration gradient in the junction region to below $10^{22}$ cm.$^{14}$. The final value of the concentration gradient decreases with time of diffusion and with increasing diffusion temperatures.

It will be understood that the PN junctions in this case are parallel to the surface of the crystal since a single large-area junction is formed. However, if the surface of the crystal is masked before diffusion, in a predetermined pattern according to known techniques, an arbitrarily selected pattern of PN junctions can be formed in the crystal. It will also be understood that a multiple junction configuration can also be inserted by transmutation, by use of a radiation die with a multiple set of slits in the cadmium.

It will therefore be realized that many configurations of PN junctions with the optical modulator properties described above can be formed. These include: (a) single junction normal to the surface; (b) single junction parallel to the surface; (c) multiple junctions with preselected spacings normal to the surface; (d) multiple junctions with preselected spacings parallel to the surface.

It will also be understood that electrical contacts must be attached to the adjacent P and N type regions to permit voltages and electric fields to be applied across each PN junction to be used as an optical modulator.

It is apparent that a PN junction used as an optical modulator requires means to direct the optical beam into the junctions at the input side of the modulator, and from the junctions at the output side. The means of directing these beams are called respectively, optical input terminals and optical output terminals. These optical terminals include lenses, mirrors, optical fibers, and optical waveguides.

While the description of wide-aperture PN junction optical modulators and structural embodiments relating to it have been set forth above, it will be appreciated that other obvious variations can be made in carrying out the invention disclosed herein. Accordingly, such variations falling within the purview of this invention may be made without in any way departing from the spirit of the invention or sacrificing any of the attendant advantages thereof, providing however, that such changes fall within the scope of the claims appended hereto.

What is claimed is:

1. An electro-optic modulator comprising at least one PN junction in a semiconductor crystal exhibiting the Pockels effect, with electrical contacts on either side of the PN junction whereby a voltage may be applied across said junction, wherein the dielectric waveguide region surrounding said junction is at least 10 microns wide, and wherein the dopant concentration gradient across said junction is less than or equal to the ratio of the difference in dopant concentrations on the two sides of said junction to the width of the dielectric waveguide region.

2. An electro-optical modulator comprising at least one PN junction in a semiconductor crystal exhibiting the Pockels effect, with electrical contacts on either side of the PN junction whereby a voltage may be applied across said junction, wherein the dielectric waveguide region surrounding said junction is at least 10 microns wide, and wherein the dopant concentration gradient across said junction region is less than $10^{22}$ cm.$^{14}$ 3. An electro-optical modulator as defined in claim 1, with optical input and output terminals at the two extremities of an optical path through said junction region.

4. An electro-optical modulator as defined in claim 2 with optical input and output terminals at the two extremities of an optical path through said junction region.

5. An electro-optical modulator as defined in claim 1, with a plurality of PN junctions.

6. An electro-optical modulator as defined in claim 2 with a plurality of PN junctions.

7. An electro-optical modulator as defined in claim 1, set between two polarizing crystals whose directions of polarization are at a substantial angle to one another.

8. An electro-optical modulator as defined in claim 2, set between two polarizing crystals whose directions of polarization are at a substantial angle to one another.

9. An electro-optical modulator as defined in claim 1, placed between a laser source and a polarizing crystal, whose polarization angle is set to extinction of the transmitted radiation when no voltage is applied across the PN junction.

10. An electro-optical modulator as defined in claim 2, placed between a laser source and a polarizing crystal, whose polarization angle is set to extinction of the transmitted radiation when no voltage is applied across the PN junction.

UNITED STATES PATENT OFFICE
CERTIFICATE OF CORRECTION

Patent No. 3,611,207                    Dated October 5, 1971

Inventor(s)  Carl N. KLAHR            (Continued)

It is certified that error appears in the above-identified patent and that said Letters Patent are hereby corrected as shown below:

Column 3, line 17, before "second" insert, --first mode, and $\Gamma 2$ is the change in phase of the--

Column 4, line 27 (both occurrences) delete "cm.$^{13}$" and insert --cm.$^{-3}$--;

line 30 (both occurrences) delete "cm.$^{14}$" and insert --cm$^{-4}$--;

lines 68, 69, and 71, delete "cm.$^{13}$" and insert --cm.$^{-3}$--.

Column 6, lines 51, 53 and 54, delete "cm.$^{13}$" and insert --cm.$^{-3}$--;

line 68, delete "cm.$^{14}$" and insert --cm.$^{-4}$-- and delete "cm.$^{114}$" and insert --cm.$^{-4}$--.

Column 7, lines 23, and 56, delete "cm.$^{14}$" and insert --cm.$^{-4}$--;

line 41 (both occurrences) delete "cm.$^{13}$" and insert --cm.$^{-3}$--;

line 43, delete "$10^{14}$" and insert --$10^{-4}$--;

line 64, after "denoted" insert --20, is uniformly doped N type while P type regions denoted--.

Column 8, line 2, delete "bnoted" and insert --denoted--; and line 53, delete "3.36" and insert --3.34--; and
line 54, delete "$10^{1}_{10}$" and insert --$10^{-10}$--

UNITED STATES PATENT OFFICE
CERTIFICATE OF CORRECTION

Patent No. 3,611,207                 Dated October 5, 1971

Inventor(s) Carl N. KLAHR              PAGE - 2

It is certified that error appears in the above-identified patent and that said Letters Patent are hereby corrected as shown below:

Column 9, line 5, delete "$10^{14}$" and insert --$10^{-4}$--;
          line 17, after "0,38" insert --cm.--.

Column 10, line 2, delete "$10^{14}$" and insert --$10^{-4}$--.

Column 11, line 20, delete "$cm^{13}{}^3$" and insert --$cm^{-3}$--;
          line 21, delete "$10^{14}$" and insert --$10^{-4}$-- and delete "$10^{13}$" and insert --$10^{-3}$--;
          lines 29 and 37, delete "$cm.^{14}$" and insert --$cm.^{-4}$--;
          line 30, delete "PN N" and insert --P-N--; and
          line 73, delete "$cm.^{13}$" and insert --$cm.^{-3}$--.

Column 12, lines 5, 8, 12, 14, 28, delete "$cm.^{13}$" and insert --$cm.^{-3}$--;
          lines 16, 38 (both occurrences) and 47, delete "$cm.^{14}$" and insert --$cm.^{-4}$--.

Column 14, line 2 (claim 2), delete "$cm.^{14}$" and insert --$cm.^{-4}$--

Signed and sealed this 9th day of May 1972.

(SEAL)
Attest:

EDWARD M. FLETCHER, JR.           ROBERT GOTTSCHALK
Attesting Officer                 Commissioner of Patents